United States Patent [19]

Wakabayashi et al.

[11] Patent Number: 5,319,497
[45] Date of Patent: Jun. 7, 1994

[54] LENS DRIVE DEVICE WITH LENS HOLDER CARRYING DRIVE FLUX GENERATING MAGNETS

[75] Inventors: Kanji Wakabayashi, Kyoto; Hironori Tomita; Tohru Nakamura, both of Katano; Noboru Kikuchi, Hirakata, all of Japan

[73] Assignee: Matsushita Electric Industrial Co., Ltd., Osaka, Japan

[21] Appl. No.: 877,705

[22] Filed: May 4, 1992

Related U.S. Application Data

[63] Continuation-in-part of Ser. No. 640,630, Jan. 14, 1991, abandoned.

[30] Foreign Application Priority Data

Jan. 12, 1990 [JP] Japan .................................. 2-005890

[51] Int. Cl.5 .......................... G11B 7/095; G02B 7/04
[52] U.S. Cl. ..................................... 359/814; 359/824; 369/44.21; 369/215; 250/201.5
[58] Field of Search ............... 369/44.11, 44.12, 44.13, 369/44.14, 44.24, 44.21, 44.22, 110, 112, 118, 119, 120, 122, 195, 199, 215, 44.17; 359/811, 813, 814, 819, 822-826; 250/201.5

[56] References Cited

U.S. PATENT DOCUMENTS

| | | | |
|---|---|---|---|
| 4,100,576 | 7/1978 | Ditthardt | 369/44.17 |
| 4,473,274 | 9/1984 | Yano et al. | 369/44.21 |
| 4,571,026 | 2/1986 | Maruta | 369/44.21 |
| 4,601,539 | 7/1986 | Watanabe | 359/824 |
| 4,643,522 | 2/1987 | Takashima | 369/44.21 |
| 4,745,589 | 5/1988 | Nomura | 359/824 |
| 4,790,628 | 12/1988 | Nanno et al. | 369/44.22 |
| 4,792,935 | 12/1988 | Kine et al. | 369/44.22 |
| 4,796,248 | 1/1989 | Ozaki et al. | 369/44.21 |
| 4,817,076 | 3/1989 | Van Slys et al. | 369/44.21 |
| 4,958,336 | 9/1990 | Suzuki et al. | 369/44.21 |
| 5,062,095 | 10/1991 | Horikawa et al. | 369/44.21 |

FOREIGN PATENT DOCUMENTS 01184637 7/1989 Japan .................................. 369/44.21

Primary Examiner—Stuart S. Levy
Assistant Examiner—Paul J. Ditmyer
Attorney, Agent, or Firm—Wenderoth, Lind & Ponack

[57] ABSTRACT

A lens drive device for an optical information recording and/or reproducing head, which has a cylindrical lens holder for the support of an objective lens assembly and a tubular guide bearing receiving the lens holder for sliding and rotary motions in a direction parallel to and about the longitudinal axis of the lens holder. The device also has magnetic yokes positioned on respective sides of the guide bearing and each having tracking and focusing coils wound therearound. The lens holder has two permanent magnets embedded therein with their respective different poles exposed radially outwardly from a peripheral surface of the lens holder. The guide bearing has two windows defined therein at respective locations corresponding to the respective positions of the permanent magnets in the lens holder. When the focusing coils on the respective yokes are energized, the lens holder can be driven in a focusing direction parallel to the longitudinal axis of the lens holder, while when the tracking coils on the respective yokes are energized, the lens holder can be driven in a tracking direction generally perpendicular to the longitudinal axis of the lens holder.

3 Claims, 3 Drawing Sheets

LENS DRIVE DEVICE WITH LENS HOLDER CARRYING DRIVE FLUX GENERATING MAGNETS

This application is a continuation-in-part of application Serial No. 07/640,630, filed Jan. 14, 1991 now abandoned.

BACKGROUND OF THE INVENTION

1. Field of the Invention

The present invention generally relates to an optical head in an optical disc player for optically recording and/or reproducing information on a disc-shaped recording medium and, more particularly, to a lens drive device used in the optical head.

2. Description of the Prior Art

The lens drive device currently used in the optical head in an optical disc player generally comprises an objective lens assembly; a guide shaft having a longitudinal axis extending parallel to the optical axis of the objective lens assembly, which optical axis extends generally perpendicular to the disc-shaped recording medium; a lens holder including a sliding bearing having the objective lens assembly mounted thereon, whereby, when a cylindrical inner surface of the lens holder having a center axis generally parallel to the optical axis of the objective lens assembly undergoes sliding and rotary motion relative to the guide shaft, the objective lens assembly can be moved in a tracking direction generally parallel to the disc-shaped recording medium and also in a focusing direction generally parallel to the optical axis; a base to which one end of the guide shaft is fixed; four tracking coils mounted on the lens holder in symmetrical relationship relative to the guide shaft, each of said tracking coils having a coil winding axis extending in a direction generally perpendicular to the longitudinal axis of the guide shaft; a focusing coil mounted on the lens holder and having a coil winding axis extending in a direction conforming to the direction of the longitudinal axis of the guide shaft; two focusing magnets mounted on the base so as to confront the opposite side faces of the focusing coil and disposed generally in symmetrical relationship relative to the guide shaft, each of said focusing magnets having a direction of magnetization generally perpendicular to the coil winding axis of the focusing coil; and four tracking magnets mounted on the base so as to confront respective side faces of the tracking coils.

The prior art lens drive device of the above-described construction generally performs the following operation.

The drive of the objective lens assembly in the focusing direction takes place when the lens holder undergoes a sliding motion along the guide shaft, secured at one end of the base, under the influence of an electromagnetic force which is obtained when the focusing coil secured to the lens holder carrying the objective lens assembly mounted thereon traverses the magnetic flux generated by the focusing magnet secured to the base.

The drive of the objective lens assembly in the tracking direction takes place when the lens holder undergoes a rotary motion along the guide shaft secured at one end to the base under the influence of an electromagnetic force which is obtained when the tracking coils secured to the lens holder carrying the objective lens assembly mounted thereon traverses the magnetic fluxes generated by the tracking magnets secured to the base.

In the prior art lens drive device referred to above, however, because the focusing coil and the tracking coil are both formed on the lens holder, the movable mechanism comprising the objective lens assembly, the lens holder and the focusing and tracking coils tends to be complicated in shape and, therefore, the distribution of the weight of the movable mechanism as a whole is dispersed making it difficult to improve the rigidity. Therefore, when the lens drive device is to be driven, it is difficult to improve the response characteristic of a displacement frequency in each of the tracking and focusing directions and also to reduce the distance between the axis of rotation and the objective lens assembly because of the axis of rotation of the lens holder being occupied by the guide shaft, thus making it difficult to provide the lens drive device in a compact size.

SUMMARY OF THE INVENTION

The present invention has been devised with a view to substantially eliminating the above-discussed problems and is intended to provide an improved lens drive device wherein a generally cylindrical lens holder is employed so that it can be concurrently used as a guide shaft, thereby to simplify the structure to accomplish a reduction in size and weight while the response characteristic of the displacement frequency in each of the tracking and focusing directions can also be broadened.

To this end, the present invention provides a lens drive device which comprises an objective lens assembly for an information recording and/or reproducing device for recording and/or reproducing optical information on a recording medium, said lens assembly having an optical axis; a cylindrical lens holder for holding the objective lens assembly and having a longitudinal axis, said objective lens assembly being mounted on the cylindrical lens holder with the optical axis offset from and generally parallel to the longitudinal axis of the lens holder; at least two permanent magnets each having first and second poles opposite to each other, said permanent magnets being secured to the lens holder with the first and second poles of the respective permanent magnets confronting each other in a direction radially of the lens holder, each of said permanent magnets having a magnetizing direction conforming to the radial direction of the lens holder; a tubular guide member having a longitudinal axis generally parallel to the longitudinal axis of the lens holder and also having a guide face for guiding the lens holder so as to move the latter in a direction parallel to the longitudinal axis thereof and also to rotate the latter in a direction about the longitudinal axis thereof; at least one magnetic yoke having two faces opposite to each other and spaced from at least the radial magnetic flux generating faces of the permanent magnets and operable to form a magnetic path from one of the two faces towards the other of the two faces; at least one tracking drive coil wound around the magnetic yoke for causing the permanent magnets to rotate the lens holder in said direction about the longitudinal axis of the guide member; and at least one focusing drive coil wound around the magnetic yoke for causing the permanent magnets to drive the lens holder in said direction generally parallel to the longitudinal axis of the guide member.

According to the present invention, the cylindrical lens holder for the support of the objective lens assembly is also used as a guide shaft, and the permanent magnets providing the source of a driving force are fixed inside the guide surface of the cylindrical lens holder. Therefore, the mass of the movable mechanism comprised of the objective lens assembly, the cylindrical lens holder and the permanent magnets can be centered adjacent the axis of rotation thereby to simplify the shape of the movable mechanism as a whole and, hence, the compact and light-weight features can be accomplsihed along with an improvement in rigidity.

Also, since the permanent magnets employed as the source of the driving force for the movable mechanism are secured to the lens holder with their different poles confronting each other, and since the magnetic yoke is disposed with the two faces opposite to each other and spaced from at least radial magnetic flux generating faces of the permanent magnets and operable to form a magnetic path from one of the two faces towards the other of the two faces, not only can the shape of the movable mechanism be simplified and reduced in weight, but also closed magnetic paths can be obtained.

The present invention is effective in that, since the cylindrical lens holder for the support of the objective lens assembly is concurrently used as a guide shaft, and since the permanent magnets providing the source of a driving force are fixed inside the guide surface of the cylindrical lens holder, the mass of the movable mechanism comprised of the objective lens assembly, the cylindrical lens holder and the permanent magnets can be centered adjacent the axis of rotation thereby to simplify the shape of the movable mechanism as a whole and, hence, the compact and light-weight features can be accomplished along with an improvement in rigidity. Because of this, the rigidity of the movable mechanism is increased so as to increase the frequency at which the movable mechanism generates a high-order resonance and, hence, the improvement of the response characteristic of the displacement frequency in each of the tracking and focusing direction can be attained when the objective lens assembly is to be driven.

Also, since the permanent magnets are used for a drive force generating means for the movable mechanism and since the tracking coils and the focusing coils are both wound around the opposite magnetic yokes, any possible increase of the temperature of the objective lens assembly during the drive thereof can be suppressed and since no connection of lead wires to the movable mechanism is required, the reliability can be improved.

In addition, since the permanent magnets are mounted on the cylindrical lens holder with the different respective poles of those magnets confronting each other while the respective magnetic paths are formed by the coupling yokes between the other different poles of the respective magnets thereby to complete closed magnetic circuits between the yokes via the coupling yokes, not only can the reduction in size and weight of the movable mechanism be attained, but also a lens drive device of high efficiency can be obtained.

Also, since the cylindrical lens holder can be reduced in size, the respective different poles of the permanent magnets can approach eah other closely and, accordingly, the densities of the magnetic fluxes produced at opposite ends of the permanent magnets which provides the source of the drive force can be rendered uniform. In other words, an unequilibrium of the driving force resulting from variation in shape of the magnets and magnetic characteristics of the magnets such as the magnetomotive force can be advantageously eliminated thereby improving the dynamic characteristics.

BRIEF DESCRIPTION OF THE DRAWINGS

These and other objects and features of the present invention will become clear from the following description of a preferred embodiment thereof with reference to the accompanying drawings, in which.

DETAILED DESCRIPTION OF THE EMBODIMENT

Figure 1:
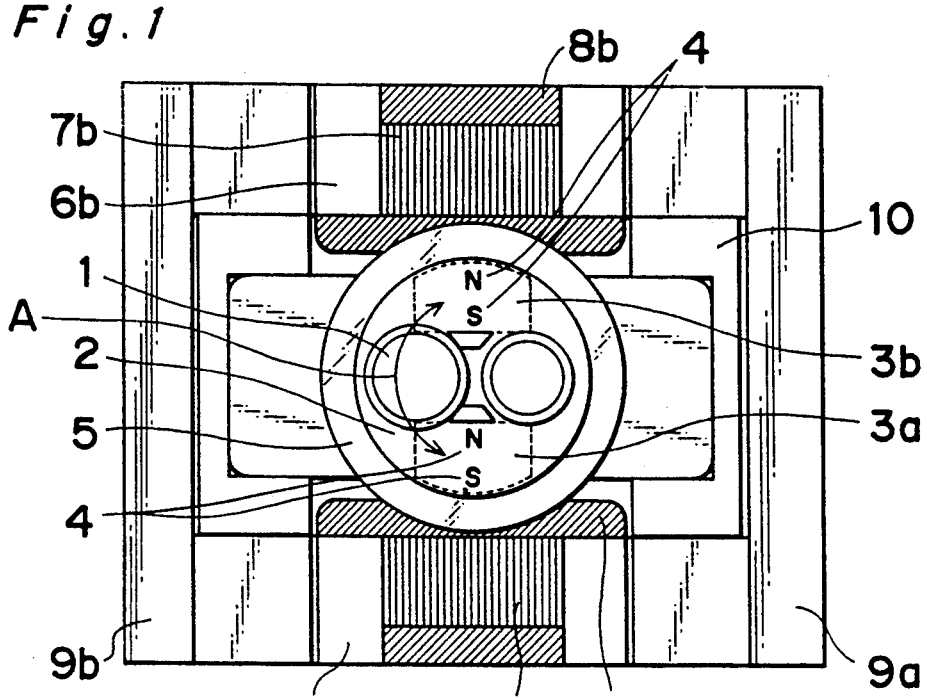
FIG. 1 is a top plan view of a lens drive device used in an optical disc player embodying the present invention.

Referring to the accompanying drawings, a lens drive device according to the present invention comprises a generally cylindrical lens holder 2 having a longitudinal axis 11 and also having an objective lens assembly 1 mounted on one end thereof and having an optical axis 0 parallel to the lens holder longitudinal axis 11, and a tubular guide bearing 5 having a longitudinal axis 11a normally coaxial with the longitudinal axis 11 of the lens holder 2 and also having an inner peripheral guide surface for guiding the lens holder 2 so as to permit it to rotate about the longitudinal axis 11. A pair of permanent magnets 3a and 3b are fixedly received in respective pockets defined in the lens holder 2 and circumferentially equally spaced from each other while one of the opposite poles 4 of one magnet 3a confronts the other of the opposite poles 4 of the other magnet 3b.

Two magnetic yokes 6a and 6b are fixedly mounted on a base 10 so as to occupy respective positions on respective sides of the tubular guide bearing 5 and having respective tracking coils 7a and 7b wound therearound. These tracking coils 7a and 7b on the respective magnetic yokes 6a and 6b cooperate with the permanent magnets 3a and 3b on the lens holder 2 to drive, i.e. rotate, the latter about the longitudinal axis 11. The magnetic yokes 6a and 6b also have respective focusing coils 8a and 8b wound therearound, which coils 8a and 8b are cooperable with the permanent magnets 3a and 3b on the lens holder 2 to drive, i.e. slide, the latter in a direction parallel to the longitudinal axis 11.

Magnetic coupling yokes 9a and 9b are fixedly mounted on the base 10 so as to occupy respective positions on respective sides of the tubular guide bearing 5 and are connected at opposite ends thereof with the magnetic yokes 6a and 6b so as to form magnetic paths between the magnetic yoke 6a and the magnetic yoke 6b.

The tubular guide bearing 5 used in the lens drive device according to the present invention has a length of 6 mm which is selected for the following reason.

Figure 5:
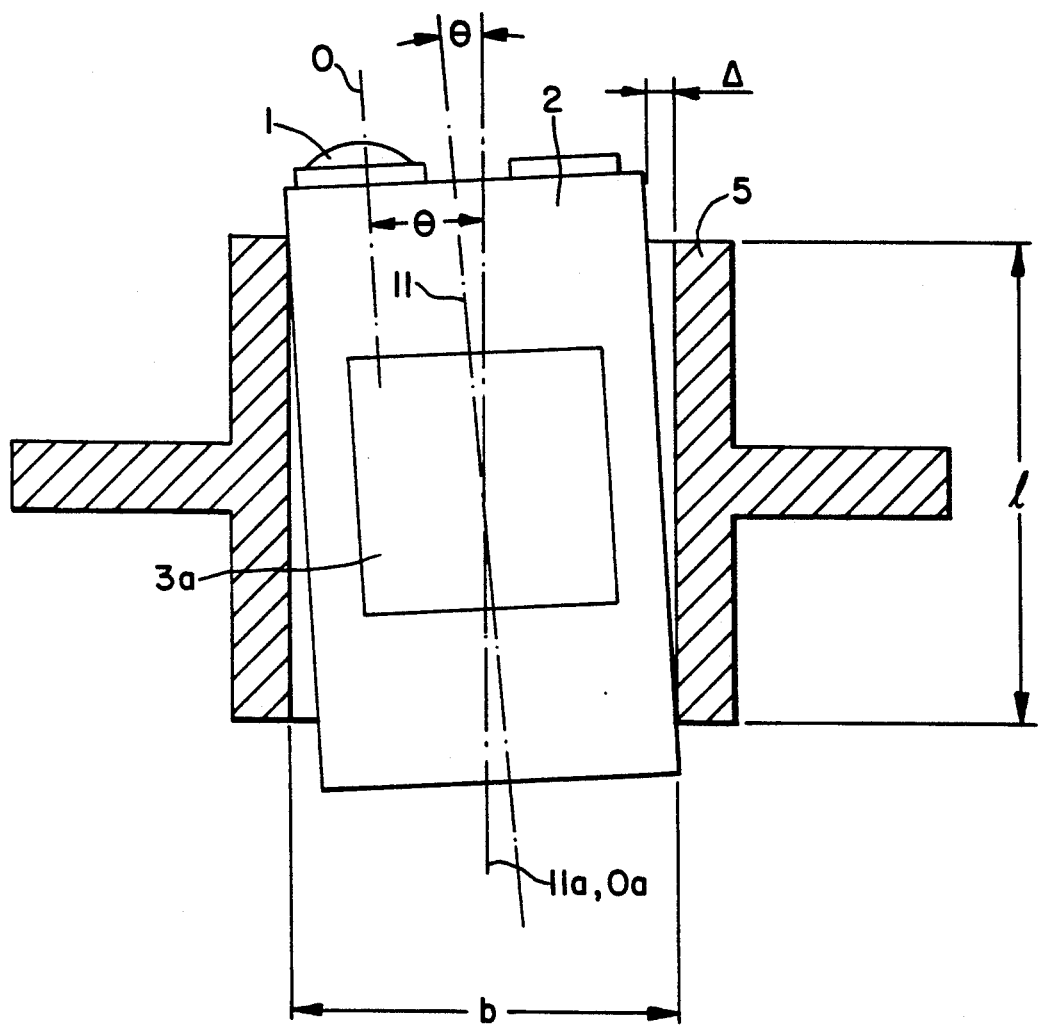
FIG. 5 is a schematic diagram illustrating the variables of an equation for determining the length of the guide bearing according to the invention.

Due to a system limitation, the inclination of the axis O of the objective lens assembly 1, and hence of the objective lens assembly 1 itself and the axis 11 of the lens holder 2 relative to a reference axis $O_a$ has to be 1.7 mrad or smaller. Assuming that the preciseness of the longitudinal axis 11a of the guide bearing 5 relative to the reference axis $O_a$ which is parallel to the desired direction of the optical axis 0 when the lens holder 2 is properly centered in the guide bearing 5 in the focusing direction as shown by arrow B and the preciseness of fitting of the objective lens assembly 1 on an upper end face of the lens holder 2 are both favorable, the maximum angle of inclination of the axis 11 of the lens holder 2 relative to the reference axis $O_1$ and guide tearing axis 11a, as shown in FIG. 5, is expressed by $\Theta$; the inner diameter of the guide bearing 5 is expressed by b; and the clearance between the guide bearing 5 and the lens holder 2 at the end of the guide bearing is expressed by $\Delta$, then the length l of the guide bearing 5 can be calculated as follows.

$$l = \{(b - (b-\Delta)/\cos\Theta\}\tan\Theta$$

If the inclination angle $\Theta$ is sufficiently small, $\cos\Theta$ will be approximately 1. Therefore, $l = \Delta/\tan\Theta$ However, due to limitations on the machining precision which can be currently accomplished, the smallest available clearance $\Delta$ is limited to 10 μm.

In view of the foregoing, it will readily be seen that the length of the guide bearing 5 is required to be:

$$l \geq 0.01/\tan(0.0017) \text{ and, hence, } l \geq 5.88 \text{ mm}$$

For the foregoing reason, the length of the cylindrical guide bearing 5 used in the practice of the present invention is selected to be 6 mm.

The lens drive device of the foregoing construction operates in the following manner.

Figure 2:
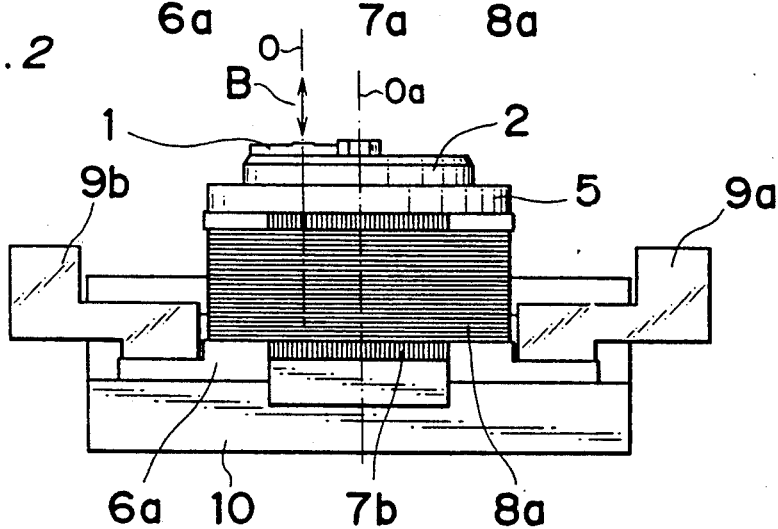
FIGS. 2 and 3 are side views of the lens drive device as viewed from different angles, respectively.
Figure 3:
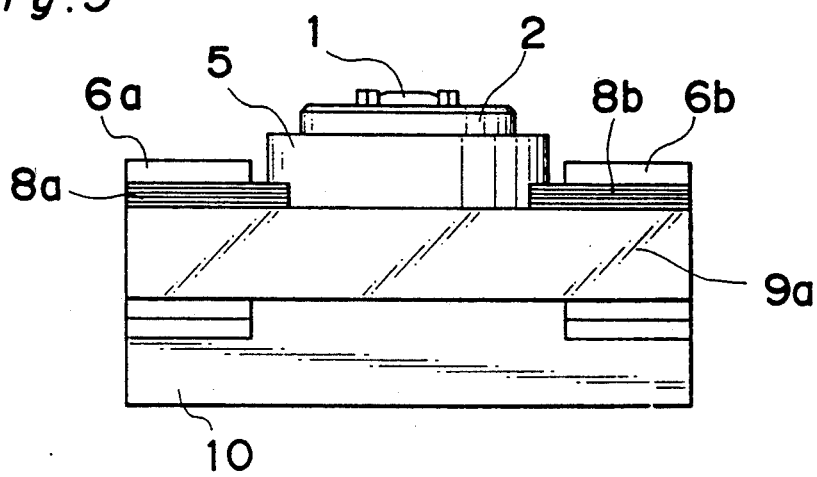
Figure 4:
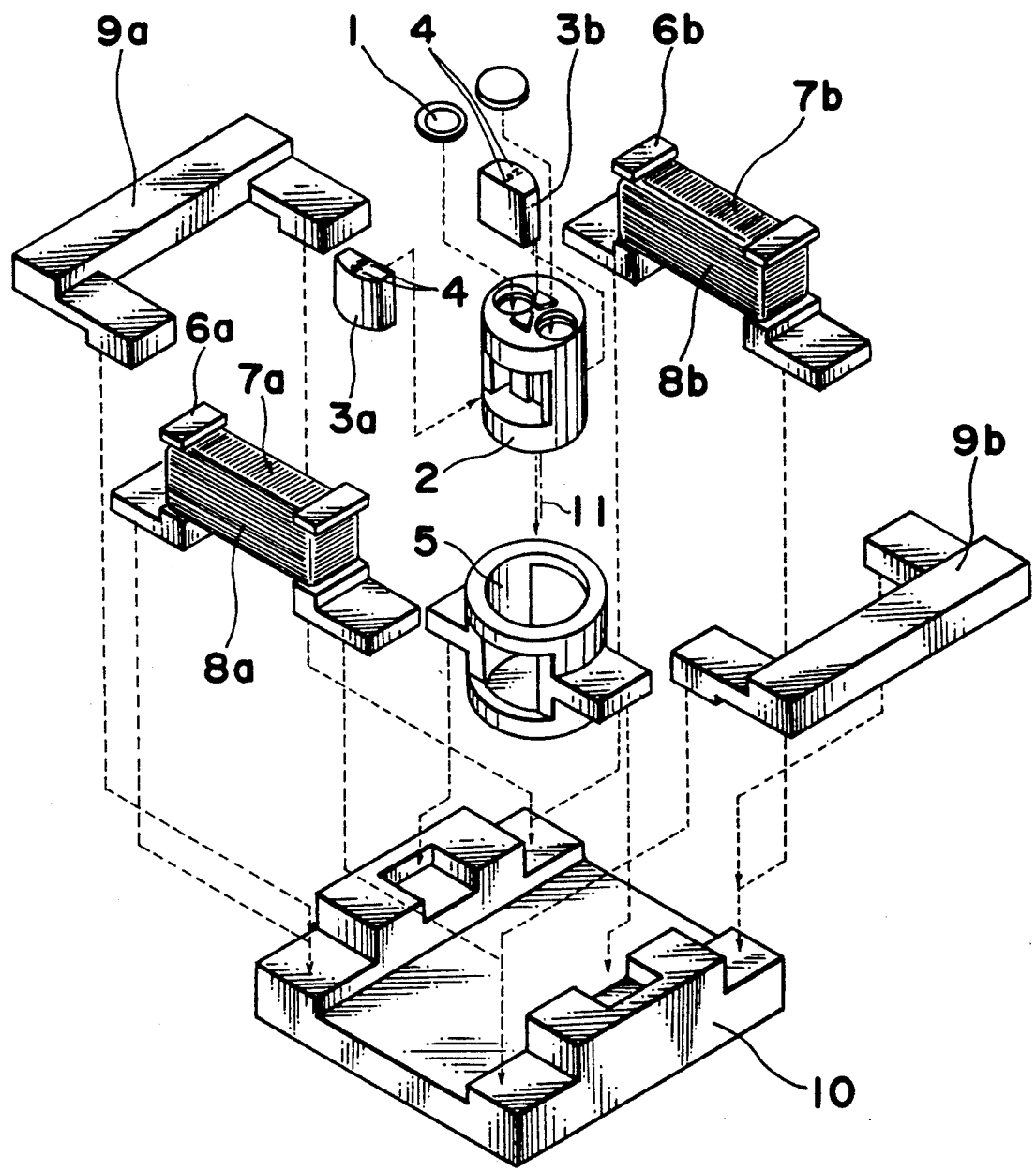
FIG. 4 is an exploded view of the lens drive device.

The drive of the objective lens assembly 1 in the focusing direction shown by the arrow B in FIG. 2 is accomplished when the cylindrical lens holder 2 undergoes a sliding motion along the inner surface of the cylindrical guide bearing 5 under the influence of an electromagnetic force obtainined when the focusing coils 8a and 8b wound around the respective magnetic yokes 6a and 6b traverse the magnetic fluxes produced by the permanent magnets 3a and 3b secured to the cylindrical lens holder 2 carrying the objective lens assembly 1.

The drive of the objective lens assembly 1 in the tracking direction shown by the arrow A in FIG. 1 can be accomplished when the cylindrical lens holder 2 undergoes a rotary motion along the inner surface of the cylindrical guide bearing 5 under the influence of electromagnetic forces obtained when the tracking coils 7a and 7b wound around the respective magnetic yokes 6a and 6b traverse the magnetic fluxes produced by the permanent magnets 3a and 3b secured to the cylindrical lens holder 2 carrying the objective lens assembly 1.

As hereinbefore described, according to the present invention, since the cylindrical lens holder 2 for the support of the objective lens assembly 1 is concurrently used as a guide shaft, and since the permanent magnets 3a and 3b providing a source of a driving force are fixed inside the guide surface of the cylindrical lens holder 2, the mass of a movable mechanism comprised of the objective lens assembly 1, the cylindrical lens holder 2 and the permanent magnets 3a and 3b can be centered adjacent the axis of rotation thereby to simplify the shape of the movable mechanism as a whole and, therefore, the compact and light-weight characteristics can be achieved along with an improvement in rigidity. Thus, the improvement of the response characteristic of the displacement frequency in each of the tracking and focusing directions can be attained when the objective lens assembly is to be driven.

Also, since the permanent magnets 3a and 3b are employed as the source of the driving force for the movable mechanism, and since the tracking coils 7a and 7b and the focusing coils 8a and 8b are both wound around the opposite magnetic yokes 6a and 6b, any possible increase of the temperature of the objective lens assembly 1 during the drive thereof can be suppressed and, since no connection of lead wires to the movable mechanism is required, the reliability can be improved.

In addition, since the permanent magnets 3a and 3b are mounted on the cylindrical lens holder 2 with different respective poles of those magnets 3a and 3b confronting each other while the respective magnetic paths are formed by the coupling yokes 9a and 9b between the other different poles of the respective magnets 3a and 3b thereby to complete closed magnetic circuits between the yokes 6a and 6b via the coupling yokes 9a and 9b, not only can a reduction in size and weight of the movable mechanism be attained, but also a lens drive device of high efficiency can be achieved. Also, since the cylindrical lens holder 2 can be reduced in size, the respective different poles of the permanent magnets 3a and 3b can approach close to each other and, accordingly, the densities of the magnetic fluxes produced at opposite ends of the permanent magnets 3a and 3b which provides the source of the drive force can be made made uniform. In other words, an unequilibrium of the driving force resulting from variation in shape of the magnets and magnetic characteristics of the magnets such as the magnetomotive force can be advantageously eliminated thereby improving the dynamic characteristics.

Although the present invention has been described in connection with the preferred embodiment thereof with reference to the accompanying drawings, it is to be noted that various changes and modification will be apparent to those skilled in the art. By way of example, instead of the use of permanent magnets, electromagnets may be employed.

Accordingly, such changes and modifications are to be understood as included within the scope of the present invention as defined by the appended claims, unless they depart therefrom.

What is claimed is:

1. A lens drive device, comprising:
   an objective lens assembly for an information recording and/or reproducing device for recording and/or reproducing optical information on a recording medium, said lens assembly having an optical axis;
   a cylindrical lens holder having an outer cylindrical surface and holding the objective lens assembly and having a lens holder longitudinal axis, said objective lens assembly being mounted on said cylindrical lens holder with said optical axis offset from and generally parallel to said lens holder longitudinal axis;
   a magnetic drive flux generating means on said lens holder for generating magnetic drive flux from at least a portion of said outer cylindrical surface of sad lens holder in a direction radially outwardly therefrom;
   guide means for guiding said lens holder and consisting of a generally cylindrical guide member having a guide member longitudinal axis generally parallel to the lens holder longitudinal axis and also having an internal guide face with which said outer cylindrical surface having said magnetic drive flux generating means of said lens holder is slidably engaged for being guided in movement in a direction parallel to said guide member longitudinal axis and also in a rotational direction around guide member longitudinal axis;

at least one magnetic yoke on said guide member disposed at a location opposed to at least said portion of the cylindrical outer side face of said lens holder at which said magnetic flux generating means is positioned;

at least one tracking drive coil wound around said magnetic yoke for causing the magnetic flux generating means to drive said lens holder in said rotational direction around said guide member longitudinal axis; and at least one focusing drive coil wound around said magnetic yoke for causing the magnetic flux generating means to drive said lens holder in said direction generally parallel to said guide member longitudinal axis.

2. A lens drive device as claimed in claim 1 in which said magnetic drive flux generating means is at least one permanent magnet embedded in in said portion of the outer cylindrical surface of said lens holder and having a magnetizing component in a direction radially of said lens holder.

3. A lens drive device as claimed in claim 1 in which said magnetic drive flux generating means is at least two permanent magnets each having first and second poles opposite each other, said permanent magnets being fixedly disposed on said lens holder with the first and second poles of the respective permanent magnets opposed to each other in a direction radially of said lens holder, and in which said magnetic yoke ha tow faces respectively spaced from said second and first poles of the respective permanent magnets and is formed only on an outer side of said lens holder and has a magnetic path from one of the two faces to the other of the two faces.

* * * * *